3,261,689
SOLUBLE COFFEE PROCESS
George B. Ponzoni, Nutley, N.J., assignor to General Foods Corporation, White Plains, N.Y., a corporation of Delaware
No Drawing. Filed June 7, 1963, Ser. No. 286,206
3 Claims. (Cl. 99—71)

This application is a continuation-in-part of Serial No. 128,979, filed August 3, 1961, now abandoned.

This invention relates to a soluble coffee product of improved aroma and flavor and, more particularly, to a process for producing such a coffee product.

Many attempts have been made to enhance the cup aroma and flavor of instant coffee products. Essentially these attempts have been directed to the isolation of some essential oil or other aromatic constituent from roasted and ground coffee. A very significant commercial improvement has been achieved by such attempts. However, many consumers of roasted and ground coffee still prefer this type of brew because of its robust cup aroma and flavor.

It has also been attempted to introduce a small fraction of ground roasted coffee into the dried soluble coffee product. However, such a product has become rancid very quickly thus releasing undesirable flavors on reconstitution while leaving an unsightly coffee sediment. Attempts to introduce the ground roasted coffee directly into the soluble coffee extract have not been viewed with favor due to the belief that the roasted coffee would lose its aromatic notes by solubilization while leaving only an undesirable dearomatized residue of coffee solids, such solids contributing only rancid flavor notes on reconstitution.

It would, therefore, be desirable if a method were devised for introducing ground roasted coffee into soluble coffee extract to thereby enhance the flavor of the soluble coffee while at the same time avoiding rancidity problems.

This invention is founded on the discovery that a stable soluble coffee product of improved flavor containing roasted and ground coffee therein, may be produced by a process which comprises preparing an aqueous extract of soluble coffee solids; tempering a charge of roasted coffee beans for at least three hours at a temperature of $-80°$ to $10°$ F. to thereby congeal the coffee oils in said beans and develop large crystals of water ice; subdividing the cooled beans at a temperature of below $-80°$ F. into fines of particulate powder wherein substantially all of the coffee fines pass through a 100 mesh U.S. Standard Sieve Screen and at least 50% pass through a 200 mesh U.S. Standard Sieve Screen; preventing oxidation of the coffee oils in the fines before adding the fines to the coffee extract; adding the charge of coffee fines to the extract while dispersing the fines to wet each particle of coffee as it enters the body of extract to thereby avoid clumping of fines in said extract, the extract being at a temperature of 40° to 100° F. and the charge of coffee fines being added at a level of 1–10% by weight of the soluble coffee solids in the extract; maintaining the extract at 40° to 100° F. while solubilizing 1–10% of the coffee solids in the fines and continuing to disperse the fines throughout the body of coffee extract; and spray drying the extract at an inlet air temperature of 300°–450° F. and an outlet air temperature of 150°–250° F., the fines being encapsulated with a thin coating of soluble coffee extract to thereby stabilize the coffee fines.

Unexpectedly, it has been found that the product of this invention enjoys a stability not found in soluble coffee products produced by a mere blending of roasted and ground coffee with the dried extract for "instant" coffee. Thus, the fixation of the particulate coffee particles in the powder produced upon spray drying, does not undergo rancidity or loss of freshness, which a product would normally be expected to encounter due to the presence of roasted and ground coffee therein. One of the reasons for this appears to be the encapsulating soluble coffee coating which is formed on the roasted and ground coffee particle during spray drying. By virtue of such a coating the roasted and ground coffee mixed with the soluble coffee will retain its freshness for substantially the same length of time as the soluble coffee extract. Advantageously, the brew prepared from the soluble coffee product of this invention provides a most desirable robust cup coffee flavor and aroma as well as an aroma in the container in which it is packed.

The invention, according to its more specific aspects, involves slowly cooling or tempering roasted coffee beans to thereby freeze or congeal the coffee oils in the beans. This is accomplished by a gradual reduction in the temperature of the beans over a period of at least 3 hours, say 6–12 hours, preferably in a freezing room having an ambient temperature of $-50°$ F. After the beans have been tempered and cooled to below 10° F., preferably to $-50°$ F., they are subjected to a hammer-milling or other impact-type milling operation whereby the roasted coffee particles are subdivided to a very fine degree. Normally, the oleaginous components of the coffee will be liberated as a result of such fine particulation and, accordingly, it is for this reason that the beans are first tempered and then ground at temperatures below $-80°$ F., preferably $-110°$ F. by co-grinding in Dry Ice. Any heat given off during grinding will be taken up by the Dry Ice and the oils solidified in the tempering step will be liquefied only to a slight extent. In any event, the various aromatic and flavor retaining oils will not be liberated to atmosphere but will solidify or remain solidified within the discrete coffee particles. After this controlled temper and grinding operation is performed, the coffee fines must be protected from atmospheric oxidation of the released coffee oils. This may be done by blanketing the coffee fines with an inert gas such as carbon dioxide, nitrogen, argon, or helium. Alternatively, the coffee fines may be stabilized by keeping the product temperature of the fines below 10° F.

It is a feature of the present invention that the soluble coffee extract containing about 20–30% soluble coffee solids is cooled to a temperature below 100° F., typically in the neighborhood of 50°–70° F. in a hold-up tank preparatory to spray drying. The aqueous coffee extract is preferably cooled to this low temperature in order to properly continue the pretreatment or conditioning of the roasted and ground coffee particles as the particles are introduced thereto in a manner wherein each particle of roasted coffee is wetted with extract. Care should be taken in the addition of the fine particles of roasted coffee to prevent clumping of the particles. This is preferably accomplished by adding the fines through a vibrating screen having a mesh size of 100 mesh U.S. Standard Sieve and agitating the extract throughout the addition stage. The hold-up tank containing the extract should be subjected to a pressurized atmosphere of inert gas (say 5–10 p.s.i.g.) during this operation to prevent foaming of the extract and degradation or oxidation of the coffee oils in the fines.

The particles of ground roasted coffee should not remain in this blend tank for more than one hour, preferably not more than 3–10 minutes. The charge of coffee fines which is usually 3–6% by weight of the soluble coffee solids in said extract is uniformly dispersed in the extract and is partially brewed and solubilized, the solubilization of coffee solids being kept below 10%. By appropriate tempering of the coffee fines preparatory to their introduction to the coffee extract and the low temperature mixing with the extract, the coffee oils which are present in the coffee fines do not introduce an undesirable "oil slick" or surface emulsion in the hold-up tank and the particles themselves are most effectively dispersed in the body of extract without clumping together. In this way the required hold-up period of the particles in the tank is not unduly prolonged and generally will not exceed 4 minutes, usually being 1–3 minutes.

It appears that the low brew temperature existing in the extract as the fines are introduced thereto elutriates or otherwise dissolves certain constituents of the roasted and ground coffee to thereby produce a final dried product of better storageability. It also appears that the low temperature solubilization of 1–10%, say 5%, of the soluble coffee solids in said fines results in a contribution of flavor and aroma constituents to the extract while leaving for the instant coffee user the completion of the solubilization step which releases the remaining flavor and aroma notes.

The dispersed, partially brewed, roasted coffee fines and the soluble coffee extract are then preferably fed to a spray drying tower where the extract is converted to liquid droplets which are dried to a powderous condition, usually by employing a countercurrent spray drying process having an inlet air temperature of 300°–450° F. and an outlet air temperature or product temperature of 150°–250° F.

The final product formed in accordance with this invention is a powderous coffee extract with a uniform dispersion of coated coffee fines. The coffee fines are largely encapsulated in the center portion of the atomized droplet of soluble coffee extract during the drying operation. Some of the larger droplets of coffee extract may encapsulate fine particles of roasted and ground coffee in the shell portion of soluble coffee, the shell acting as a matrix for the fines whereby the fines are coated and secured physically in place in such shell material. However, regardless of the mode of encapsulation the soluble coffee product will be relatively stable and will have improved flavor and aroma. The powderous extract will be found to contain aroma and flavor constituents extracted during the low temperature agitation or mixing operation in the hold-up tank and stable coffee fines having flavor and aroma constituents not capable of extraction at low temperatures which are retained within the roasted and ground coffee. These constituents are unstable during storage and present a distinct problem if loss of fresh coffee flavor is to be prevented. The encapsulating soluble coffee coating which is formed during spray drying is most suitable in prolonging the storage life of the coffee fines to that of the instant coffee extract and enables the trapped flavors and aromas to be released on reconstitution.

Although the sprayed coffee extract forms dry hollow particles which contain coffee fines trapped therein and thereby stabilizes the coffee fines thus allowing such product to be processed and stored similar to regular "instant" coffee, it is preferred to package the instant coffee product of this invention under an inert gaseous atmosphere. The jar of instant coffee product will preferably be purged of oxygen by means of an inert gas sparge with carbon dioxide, nitrogen, argon, etc. The bin containing soluble coffee powder will have mixed therewith inert gas to remove occluded oxygen or other materials tending to contribute toward rancidity. The bin containing the oxygen-free powder will then be subjected to a vacuum packing operation preferably accompanied with a carbon dioxide or nitrogen inter-mixing as the instant coffee powder is caused to issue from the head of the packaging machine into the coffee. This instant coffee powder may then be packaged under a super-atmospheric headspace pressure in the container in order to maintain a positive headspace of inert gas and thereby further stabilize the product.

According to the present invention, therefore, it is contemplated that the instant coffee product may be packaged in a container such as a jar or a can and preferably separated substantially from all of the oxygen which may be present with the dried coffee extract or carried with it incident to filling and packing of the instant powder in a suitable container. Therefore, the soluble coffee product of the present invention is suitably packaged in a container which is air tight and wherein inert gas is overtly injected or swept through the body of coffee to reduce the oxygen level to below 1% by volume.

The dried powder is free-flowing and is spooned from the container in measured quantities for each coffee cup. The soluble coffee possesses an aroma and cup flavor more reminiscent of freshly brewed coffee as the addition of boiling water by the instant coffee user completes the brew function of the roasted fines. The product reconstitutes to a desired point without over-brewing the coffee fines to release detrimental flavor constituents or under-brewing with the release of only a portion of the desirable flavor and aroma constituents.

The invention will now be more fully described by reference to the following example:

Approximately 100 lbs. of ordinary commercial roasted whole beans were stored for 24 hours in a freezing room having an ambient temperature of 20° F. The prolonged cooling serving to slowly form large ice crystals and solidify the flavor and aroma retaining oils in the coffee. The beans were then mixed with about 100 lbs. of finely divided Dry Ice (solid $CO_2$), the Dry Ice being uniformly distributed throughout the beans to protect the solidified oils during grinding of the coffee beans. The bean-Dry Ice mixture was then fed into a mill, such as a Fitzpatrick mill, operating at 7000 r.p.m. and having a 100 mesh U.S. standard sieve screen, the sieve opening of the screen being 0.0059 inch. The mixture was co-ground to give a predominantly 200 mesh or smaller coffee particle size dispersed in equally fine particles of Dry Ice. About 5 lbs. of the fines were then added to 300 lbs. of coffee extract containing 95 lbs. of soluble coffee solids, thereby giving a 5% level of fines to 95% of soluble solids. The fines were protected from atmospheric oxidation under a blanket of $CO_2$ gas prior to adding the fines to the extract.

The temperature of the extract was lowered to 60° F. prior to adding the fines to the extract through a vibrating 100 mesh U.S. Standard Screen while continually agitating the extract. In this manner all of the particles of coffee were individually wetted and no clumping problems were presented. The extract was agitated for about 3 minutes while keeping the extract temperature at 60° F. to disperse the fines and allow a low temperature extraction of about 6% coffee solids. The extract was kept under a $CO_2$ atmosphere at a pressure of about 5 p.s.i.g. during the agitation to prevent foaming of extract and degradation of the coffee oils in the fines. The mixture was then fed while agitation continued to a conventional spray drying tower commonly used to dry soluble coffee extract. The mixture was spray dried at an inlet air temperature of 350° F. and an outlet air temperature of 200° F. Spraying pressure was about 2950 cubic feet per minute.

The dried product was composed of 95% by weight soluble coffee extract and 4.6% by weight roasted coffee fines. The fines were evenly distributed throughout the extract by spray drying and were found to contain a soluble coffee coating most suitable for encapsulating the aroma and flavor constituents of the roasted coffee. The dried product was packaged and stored in an air tight glass container with a positive headspace pressure of carbon dioxide after the coffee was reduced to less than 1% oxygen content by sweeping with carbon dioxide prior to packaging. The dried powder was very stable, free-flowing, and adapted to be spooned in measured quantities similar to regular "instant" coffee while containing a "trapped" aroma and flavor most reminiscent of roasted and ground coffee. These qualities were released at the desired time by contact with a measured amount of boiling water added by the instant coffee user to give a final brew very similar to that made completely from roasted and ground coffee.

While the invention has been described by a specific example the limits of this invention should be determined by reference to the appended claims.

What is claimed is:

1. In the art of aromatizing soluble coffee with particles of freshly roasted and ground coffee the improvement which comprises forming a liquid extract of soluble coffee solids, said extract having a temperature of between 40 and 100° F., tempering a separate charge of freshly roasted coffee for at least 3 hours at a temperature of between −80° and 10° F. to congeal the coffee oils present in said coffee and form large crystals of water ice, subdividing the tempered coffee at a temperature of below −80° F. to a size wherein substantially all of the coffee passes through a 100 mesh U.S. Standard sieve screen and at least 50% passes through a 200 mesh U.S. Standard sieve screen, dispersing the charge of coffee in said liquid extract, said coffee being added at level of 1 to 10% by weight of the total soluble solids in the extract, maintaining said extract at 40° to 100° F. while solubilizing between 1 and 10% of the coffee solids present in said fines, and spray-drying said extract to thereby encapsulate the freshly roasted coffee with a thin coating of dry coffee extract which serves to stabilize the roasted coffee.

2. In the art of aromatizing soluble coffee with particles of freshly roasted and ground coffee the improvement which comprises forming a liquid extract of soluble coffee solids, said extract having a temperature of between 50° and 70° F., tempering a separate charge of freshly roasted coffee for at least 3 hours at a temperature of between −80° and 10° F. to congeal the coffee oils present in said coffee and form large crystals of water ice, subdividing the tempered coffee at a temperature of below −80° F. to a size wherein substantially all of the coffee passes through a 100 mesh U.S. Standard sieve screen and at least 50% passes through a 200 mesh U.S. Standard sieve screen, dispersing the charge of coffee in said liquid extract, said coffee being added at a level of 3 to 6% by weight of the total soluble solids in the extract, maintaining said extract at 50° to 70° F. while solubilizing about 5% of the coffee solids present in said fines, and spray-drying said extract to thereby encapsulate the freshly roasted coffee with a thin coating of dry coffee extract which serves to stabilize the roasted coffee.

3. In the art of aromatizing soluble coffee with particles of freshly roasted and ground coffee fines the improvement which comprises forming a liquid extract of coffee solids having a temperature of between 50° and 70° F., tempering a separate charge of freshly roasted coffee for at least 3 hours at a temperature of between −80° and 10° F. to solidify the coffee oil present in said coffee and form large crystals of water ice, grinding said tempered coffee to a particle size wherein all of the said coffee passes through a 100 mesh U.S. Standard sieve screen and at least 50% passes through a 200 mesh U.S. Standard sieve screen, blanketing said coffee fines with an inert gas to thereby prevent oxidation of the coffee oils in said fines, dispersing the charge of coffee fines in said liquid extract by sifting said fines through a 100 mesh U.S. Standard sieve screen to thereby wet each particle of ground coffee and prevent clumping of the ground coffee, said coffee being added at a level of between 3 and 6% by weight of total soluble solids in the extract, maintaining said extract at a temperature of about 50° to 70° F. while solubilizing about 1 to 10% of the coffee solids present in said fines, and spray-drying said liquid extract to thereby encapsulate the coffee fines with a coating of dry soluble coffee which serves to stabilize the coffee fines.

References Cited by the Examiner
UNITED STATES PATENTS

| | | | |
|---|---|---|---|
| 1,214,875 | 2/1917 | Aslund et al. | 99—71 |
| 2,235,315 | 3/1941 | Donnelly | 99—152 |
| 2,410,157 | 10/1946 | Fredrickson | 99—71 |
| 2,562,206 | 7/1951 | Nutting | 99—71 |
| 2,569,217 | 9/1951 | Bagdigian | 99—152 X |

FOREIGN PATENTS

| | | |
|---|---|---|
| 691,845 | 5/1953 | Great Britain. |

A. LOUIS MONACELL, *Primary Examiner.*

HYMAN LORD, *Examiner.*

M. W. GREENSTEIN, *Assistant Examiner.*